(12) United States Patent
Bauer et al.

(10) Patent No.: US 10,272,806 B2
(45) Date of Patent: Apr. 30, 2019

(54) VEHICLE SEAT

(71) Applicant: I.G. BAUERHIN GMBH, Gruendau (DE)

(72) Inventors: Stefan Bauer, Alzenau-Michelbach (DE); Thorsten Schleucher, Hasselroth (DE)

(73) Assignee: I. G. BAUERHIN GMBH, Gruendau (DE)

( * ) Notice: Subject to any disclaimer, the term of this patent is extended or adjusted under 35 U.S.C. 154(b) by 0 days.

(21) Appl. No.: 15/680,595

(22) Filed: Aug. 18, 2017

(65) Prior Publication Data

US 2018/0065524 A1    Mar. 8, 2018

(30) Foreign Application Priority Data

Sep. 7, 2016   (DE) .................... 20 2016 005 441 U

(51) Int. Cl.
   *B60N 2/56*   (2006.01)
(52) U.S. Cl.
   CPC ........... *B60N 2/5642* (2013.01); *B60N 2/565* (2013.01); *B60N 2/5635* (2013.01); *B60N 2/5657* (2013.01)
(58) Field of Classification Search
   CPC ...... B60N 2/5642; B60N 2/56; B60N 2/5635; B60N 2/565; B60N 2/5657
   USPC .................................................. 297/180.14
   See application file for complete search history.

(56) References Cited

U.S. PATENT DOCUMENTS

| | | | | |
|---|---|---|---|---|
| 6,179,706 B1 * | 1/2001 | Yoshinori | ............ | B60N 2/5635 297/180.14 |
| 6,291,803 B1 * | 9/2001 | Fourrey | .................. | B60N 2/58 219/202 |
| 6,626,488 B2 * | 9/2003 | Pfahler | .................. | A47C 7/744 297/180.11 |
| 6,685,553 B2 * | 2/2004 | Aoki | .................... | B60N 2/5635 297/180.14 |
| 6,929,322 B2 * | 8/2005 | Aoki | .................. | B60H 1/00285 297/180.13 |

(Continued)

FOREIGN PATENT DOCUMENTS

| | | | |
|---|---|---|---|
| DE | 10 2005 014 333 A1 | 10/2006 | |
| DE | 203 21 141 U1 | 11/2006 | |

(Continued)

*Primary Examiner* — Mark R Wendell
(74) *Attorney, Agent, or Firm* — Robert W. Morris; Eckert Seamans Cherin & Mellot, LLC; Ojeiku C. Aisiku

(57) ABSTRACT

A vehicle seat comprises a seat cushion part, having a cushion element, and a backrest part, at least one of which has an air conditioning device with a fan unit and an air conditioning insert. The air conditioning insert has an air distribution space, which is delimited on one side by at least one top layer. The air distribution space supplies air through the fan unit via the bottom layer located opposite the top layer and the air from the air distribution space is dispersed via the top layer. The air distribution space is separated by at least one separating element extending between the top layer and the bottom side, such that one air outlet plate is associated with the fan unit. At least one air outlet opening rests on the plane of the separation element that is associated with the bottom side of the air distribution space such that the at least one air outlet opening supplies air to both the one and the other partial region.

21 Claims, 14 Drawing Sheets

(56) References Cited

U.S. PATENT DOCUMENTS

| | | | | |
|---|---|---|---|---|
| 7,013,653 B2* | 3/2006 | Kamiya | ............... | B60N 2/5635 |
| | | | | 62/244 |
| 7,201,441 B2* | 4/2007 | Stoewe | ............... | B60N 2/5635 |
| | | | | 297/180.1 |
| 9,055,820 B2* | 6/2015 | Axakov | ................. | A47C 7/744 |
| 9,283,879 B2* | 3/2016 | Helmenstein | ........ | B60N 2/5657 |
| 9,695,828 B2* | 7/2017 | Helmenstein | ........... | F04D 17/16 |
| 2003/0102699 A1* | 6/2003 | Aoki | ................. | B60H 1/00285 |
| | | | | 297/180.14 |
| 2003/0186642 A1* | 10/2003 | Aoki | .................... | B60N 2/5635 |
| | | | | 454/120 |
| 2007/0101729 A1* | 5/2007 | Aoki | ................. | B60H 1/00285 |
| | | | | 62/3.61 |
| 2015/0079892 A1 | 3/2015 | Bauer et al. | | |
| 2016/0144754 A1 | 5/2016 | Bauer | | |
| 2016/0347217 A1* | 12/2016 | Nishimura | ........... | B60N 2/5635 |
| 2017/0201213 A1 | 7/2017 | Bisanti et al. | | |
| 2017/0201262 A1 | 7/2017 | Bisanti et al. | | |

FOREIGN PATENT DOCUMENTS

| | | |
|---|---|---|
| DE | 10 2006 004 465 A1 | 8/2007 |
| DE | 10 2012 006 074 A1 | 11/2012 |
| DE | 20 2012 010 708 U1 | 1/2013 |

\* cited by examiner

VEHICLE SEAT

BACKGROUND OF THE INVENTION

The present invention relates to a vehicle seat. Such a vehicle seat has both a seat cushion part and a backrest part. Each of these elements has a cushion in the form of a cushion element. For seat air conditioning, at least the one part is equipped with an air conditioning device. For this air conditioning, the seat cushion part and/or the backrest part is equipped with an air conditioning insert, which has an air distribution space, which is supplied or from which air is removed via a fan unit. On the one side, that is facing the user, the air conditioning insert is delimited by at least one top layer. Air is supplied to or removed from the air distribution space at the bottom that is located opposite the top layer and is then dispersed from the top layer or removed from there.

A vehicle seat with an air conditioning device is described in DE 20 2014 009 326 U1 (corresponding to US2016144754A1). This air conditioning device comprises an air conditioning insert which is inserted into a recess on the side of an cushion core facing an occupant, having an air-permeable cushion cover that covers the seat area and is arranged on the side of the air conditioning insert facing the occupant and having a fan that is inserted at least partially into a recess on the side of the cushion core facing the occupant. The fan draws in air from partial regions of the seat area and supplies air to partial regions of the seat area. At least a part of the air guidance between the fan and the cushion cover is carried out via an air distribution layer of the air conditioning insert. The air conditioning insert is subdivided transversely or longitudinally with respect to the seat direction into at least one first area section and into at least one second area section, wherein the at least one first area section and the at least one second area section are fluidically separated from one another. Here, the first area section has the air distribution layer, and this air distribution layer of the first area section is connected to fan's intake side. The fan delivers at least a portion of the air drawn in via the first area section via the second area section to the seat area.

Another vehicle seat with an air conditioning device is known from DE 10 2012 006 074 A1. The motor vehicle seat comprises a tub section designed as a closed shell with a cushioning placed therein, which is covered by an air distribution layer covered by an air-permeable covering and arranged on a surface associated with a vehicle occupant. The air distribution layer has a uniform structure over its entire area. The air distribution layer is supplied with air via air guide channels in the cushioning by means of a fan that is arranged on the bottom side of the cushioning, also within the tub part. The distribution space, which is arranged between the fan and the air guide channels for the distribution of the air to the air guide channels, is delimited on the bottom by the base of the tub part. These air guide channels extend through the cushioning or cushioning layer from the bottom side to the top side. While air is supplied to the two outer regions via the air guide channels, air is drawn via the fan from a middle region of the air distribution layer.

DE 20 2012 010 708 U1 (corresponding to WO2014072037A1) describes an assembly for air conditioning a vehicle seat with a cushion element, which in one embodiment is covered by an air distribution layer divided into two air distribution spaces. While this air distribution layer is thus located on the top side, i.e. on the A-side of the cushion element, the ventilation unit is connected to the air moving device (fan) on the bottom side of the cushion element, i.e., on the B side. Thus, the air circulates from the top of the cushion element to the air moving means arranged on the bottom side of the cushion element via air channels that pass through the cushion element.

DE 20 2013 006 135 U1 (corresponding to US2015079892A1) describes an air conditioning device for a vehicle seat with a spacer material which is covered on its top side with a top layer and on its bottom side with a bottom layer, which is essentially impermeable to air. The top layer and the bottom layer are joined around the outer circumference via a frame-shaped insert that delimits the air distribution space on the outer side, wherein the top layer is connected to the top side and the bottom layer on the bottom side of the frame-shaped insert, for example by gluing.

DE 203 21 141 U1 (corresponding to WO2004005068A1) describes an insert for ventilating a vehicle seat that is arranged below the covering of a seat cushion or a backrest. The insert has a spacer material, which is covered on its bottom side by a barrier layer, wherein this barrier layer is attached to the spacer material by means of an adhesive layer. On the top side, the spacer material is covered by a further barrier layer, which in turn is attached to the spacer material with an adhesive layer. A heating layer, which in turn is covered by a buffer layer, is attached to the barrier layer, again by means of an adhesive layer. Through-holes are located in the layers above the spacer material. The spacer with the layers arranged thereon has an extension that is used to supply air via a fan arranged away from the seat area or the backrest area.

DE 10 2005 014 333 A1 relates to an air conditioned seat and an air conditioning device. The air conditioning device comprises an air conditioning mat arranged below the surface of the seat area or below the area of the rest, which is connected to an air-guiding device, for example, a fan. The air conditioning mat is constructed as a bag made of an essentially air-impermeable material, the bag having air passage openings at its top side.

DE 10 2006 004 465 A1 (corresponding to EP1813471B1) describes an insert part for an air conditioned vehicle seat. The insert part comprises at least one air-permeable upper cover layer, below it a three-dimensional air distribution layer and at least one lower cover layer, which includes at least one air inlet. The upper cover layer and the lower cover layer are joined together along a laterally extending circumferential edge of the air distribution layer. A fan unit is arranged on the lower cover layer and is used to supply air to the air distribution layer.

SUMMARY OF THE INVENTION

The principal objective of the present invention is to provide a vehicle seat with an air conditioning device for a seat cushion part and/or a backrest part allowing a targeted distribution of the air via the air distribution space to the various area sections of the seat cushion part and/or the backrest part without the need for an elaborate air guidance structure between fan and air distribution space.

This objective, as well as other objectives which will become apparent from the description that follows, are achieved according to the present invention, by providing a vehicle seat wherein the air distribution space is subdivided into at least two partial regions by at least one separating element, also be referred to as a web element, which extends between the top layer and the bottom side. The air outlet plate, which is associated with the fan unit, has at least one air outlet opening, which rests on the plane of the separating element associated with the bottom side of the air distribution space, such that the at least one air outlet opening supplies air to both the one and the other partial region. As a result, no long and consequently constructively complex air guide structures are required that distribute the air between the fan unit and the regions of the air distribution space. The distribution of air that is delivered by the fan or is drawn in, takes place directly via the air outlet plate. The air outlet plate is associated with the separating element such that in the region of the air outlet plate the air is distributed to the at least two air distribution spaces, which are separated from one another by the separating element.

It is provided that the air distribution space is subdivided into several partial regions by a plurality of separating elements. In such an arrangement, one end of the respective separating elements is covered by the air outlet plate of the fan unit. These one ends of the respective separating elements are connected to one another in the region of the air outlet plate of the fan unit such that the respective partial regions are separated from each other. At least one air outlet opening or a partial region of an air outlet opening in the air outlet plate is associated with each partial region. In this arrangement, too, in which the air distribution space is subdivided into a plurality of partial regions, these partial regions are connected directly to the fan unit via the air distribution plate without the need for additional flow paths.

In one advantageous embodiment, the one ends of the separating elements extend radiating from a common connecting point, which is covered by the air outlet plate of the fan unit. A partial region of the air distribution space is formed between respective adjacent separating elements extending from the connecting point or node point.

It is preferably provided that the respective size of the air outlet openings in the air outlet plate associated with the partial regions is proportional to the size of the respective partial region. This means that the size of the respective air outlet opening in the air outlet plate, which is associated with a partial region, is set in proportion to the percentage portion of the size of this partial region to the total size of the air distribution space. The size of a partial region and the size of the air distribution space refer to the size of the area that the partial region and the air distribution space have from the perspective of the seat area or the backrest area. In this case, it is assumed that the air distribution space has a constant thickness between the top side and the bottom side. If the thickness of the air distribution space varies between the top side and the bottom side, the size of the respective air outlet opening in the air outlet plate associated with a partial region can be dimensioned in relation to the volume of the respective partial region.

An air outlet opening in the air outlet plate, which is associated with a plurality of partial regions of the air distribution space, can be subdivided into the air outlet openings associated with the respective partial regions by the separating elements dividing the air distribution space into the several partial regions.

The air outlet plate can be made of any material so that the air outlet plate is not damaged by the load of an occupant and is not impaired in its function, for example by a deflection caused by the load of a person sitting on the seat area. Preferably, the air outlet plate is made of plastic. The air outlet plate can be made of a cast material, an injection molded material, or both. The air outlet plate can be made of metal.

The separating elements, which subdivide the air distribution space into the partial regions, are preferably formed by an essentially air-impermeable foam material. As a result, the separating elements are compliant in a certain area, such that they do not impair the sitting comfort by not being perceived. In addition, they contribute to the cushioning.

In addition to the separating elements that subdivide the air distribution space into the partial regions, reinforcement webs can be arranged in the respective partial regions, which extend between the top layer and the plane associated with the bottom side of the air distribution space and thereby help to maintain the cross section of the respective partial region under load.

In one embodiment, the air distribution space can be covered on the bottom side opposite the top layer by at least one bottom layer, wherein the area associated with the air outlet opening(s) of the air outlet plate is not covered by the bottom layer.

In one advantageous embodiment, the air distribution space is delimited by a frame around the outer circumference. In such an embodiment, the air conditioning insert can be placed on a cushion element. However, it is also provided that the air conditioning insert, whether with such a frame or without such a frame, is inserted into a correspondingly adapted recess in the cushion element. In this case, the lateral edges of the recess can delimit the air distribution space laterally without the need for additional elements.

When using such a frame that surrounds the outer circumference of the air distribution space, the top layer, which covers the air distribution space on the top side, is preferably connected to the frame. The same applies to a bottom layer, which is intended to delimit the air distribution space on the bottom side; such a bottom layer is also joined with the frame.

In a further embodiment in which both at least one top layer and at least one bottom layer cover the air distribution space, this top layer and this bottom layer are joined together around the outer circumference of the air distribution space.

The top layer and/or the bottom layer are preferably made of a nonwoven, needle fleece, felt, fabric or knitted fabric. The material may additionally have air-impermeable properties by being provided with a respective coating. However, it is also provided that the material used, such as non-woven, needle fleece, felt, fabric or knitted fabric, has such a density that it prevents air penetration or permits this only to a negligible degree. If a rather air-impermeable material is used in particular for the top layer, it is necessary to introduce a suitable number of holes into the material so that the air can flow through accordingly. A plastic film, for example a polyurethane film, or also a different kind of plastic film can be used as an air-impermeable material as well. Especially preferred is the use of a material that is air-permeable by itself without additional holes, such as a nonwoven, needle fleece, felt, fabric or knitted fabric, for the top layer.

Particularly preferred is an arrangement in which the fan unit at least partially extends into an opening leading through the cushion element. In this case, the fan unit can draw air via the opening in the cushion element.

In a particularly preferred embodiment, the air outlet plate forms directly a bottom surface of a fan housing of the fan unit. Furthermore, if the air outlet plate serving as the bottom surface of the fan housing forms a part of the fan housing that is detachable and thus replaceable, the fan unit can be adapted to the respective requirements placed on the opening in the air outlet plate.

For reinforcing the air distribution space, additional reinforcing bars or supporting webs, extending from the frame and/or at least from one of the separating elements can extend in the respective partial region of the air distribution space. However, these reinforcing bars have only such a length that the individual regions are fluidly connected between the reinforcing bars of the respective partial region.

The frame that delimits the air distribution space on the outer side, as well as the reinforcing bars, are preferably made from a foam material.

A spacer material, preferably one that is essentially air-permeable, can be used in at least one of the partial regions. In an advantageous manner, those partial regions are filled with such a spacer material that can be subjected to an increased load by a person sitting on the seat. The spacer material can almost entirely fill the respective partial region. A knitted spacer fabric, metal-reinforced plastic spirals, helical springs or a very open-cell foam material can be used as the spacer material.

Even if it is provided that the partial regions of the air distribution space are separated from one another by the separating elements, pressure equalizing openings that connect the partial regions with one another can nevertheless be present. Such pressure equalization openings are small interruptions of the separation elements or small openings in the separation elements. Such pressure equalization openings can also be formed by the end of the separating element being spaced from the edge of the air distribution space.

If a bottom layer is used to delimit the bottom of the air distribution space, it should be essentially air-impermeable. However, since such a bottom layer rests on the cushion element, a bottom layer that is essentially permeable to air could be used as well.

The material of the frame that delimits the air distribution space on the outer side may not be more solid than the spacer material of the air distribution space. Otherwise, haptic and sitting comfort problems will occur. If the air distribution space does not have any spacer material, then the material of the frame that delimits the air distribution space on the outer side should advantageously be selected such that the foam does not penetrate the material of the top layer and/or the bottom layer into the air distribution space and collapses in a manner of speaking. In this case, an essentially closed-cell foam, a nonwoven, felt or synthetic polymers, for example, silicone, is preferably used as the material for the frame-shaped insert.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
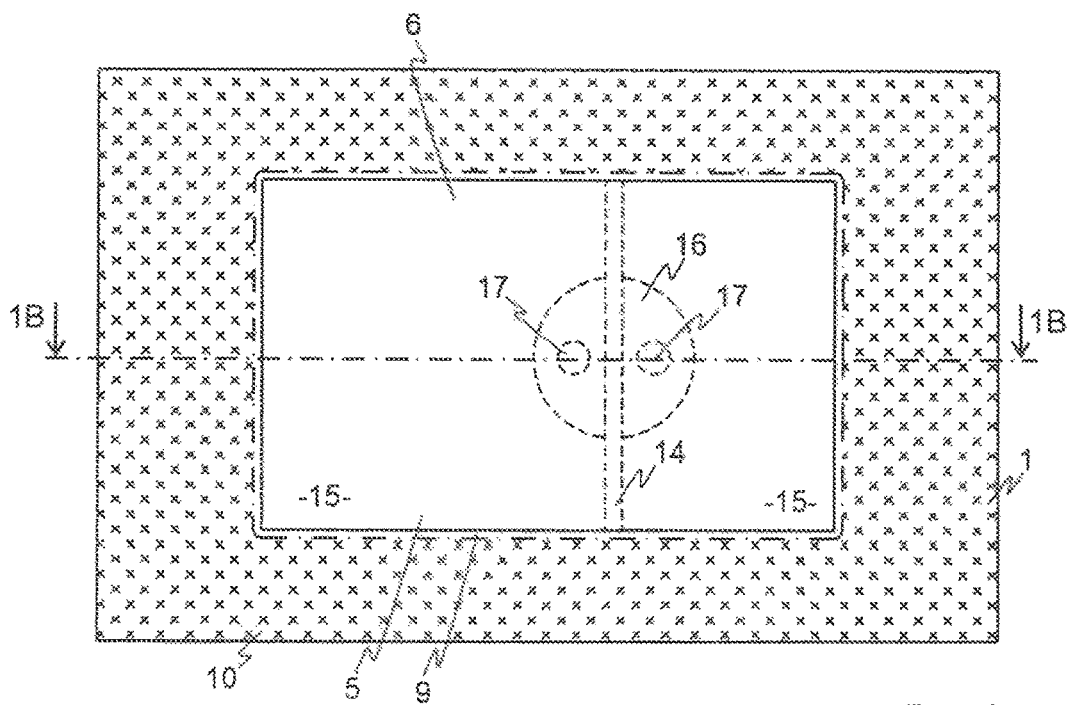
FIG. 1A is a top view of the cushion element of a vehicle seat with an air conditioning insert of a first embodiment according to the invention.

The preferred embodiments of the present invention will now be described with reference to FIGS. 1-10B of the drawings. Identical elements in the various figures are designated with the same reference numerals.

Figure 3A:
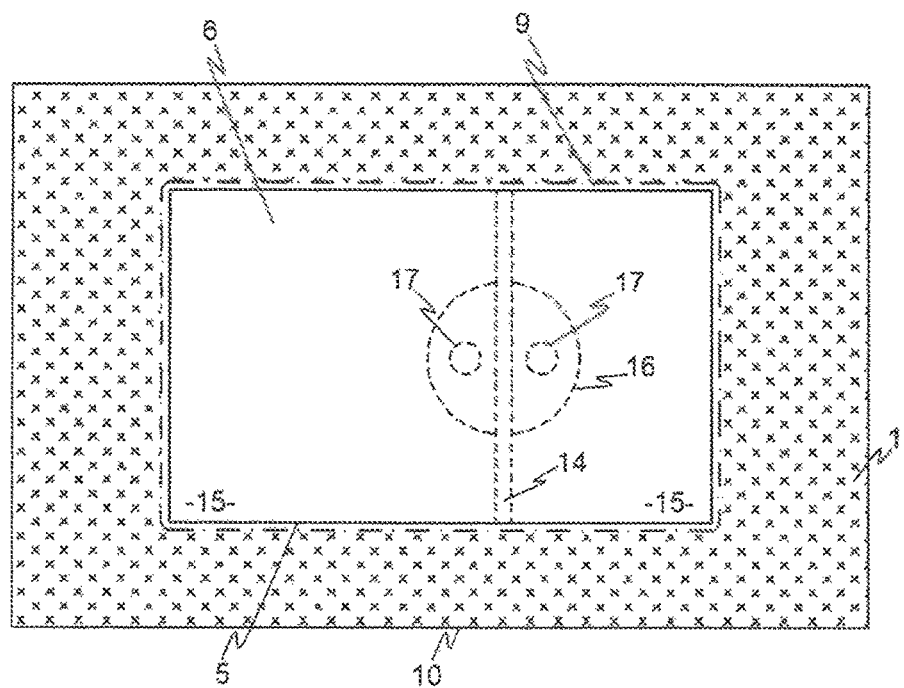
FIGS. 3A and 3B illustrate a third embodiment according to FIGS. 1A and 1B of a cushion element with an air conditioning insert according to the invention.
Figure 3B:
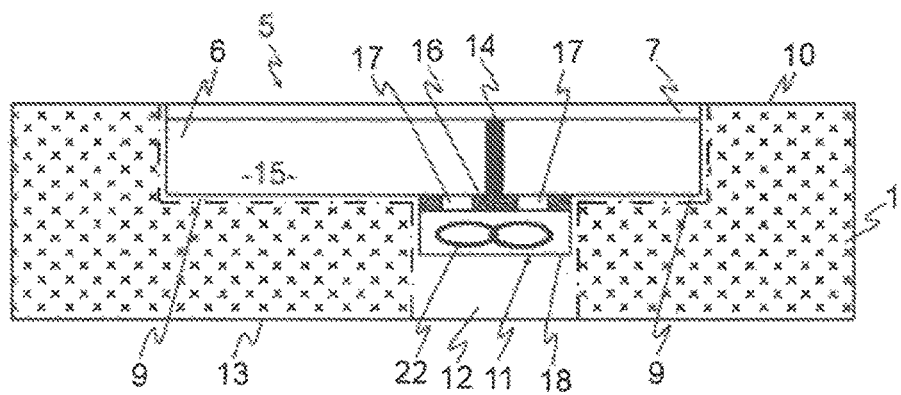
Figure 4:
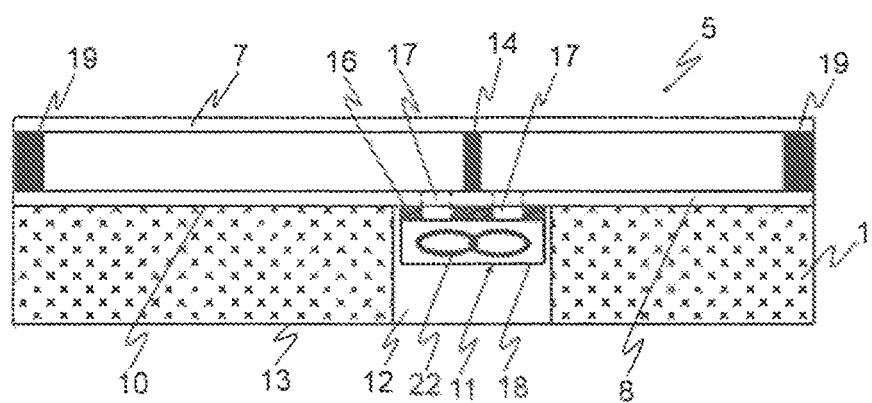
FIG. 4 is an illustration of a fourth embodiment in a sectional view according to the invention.
Figure 5:
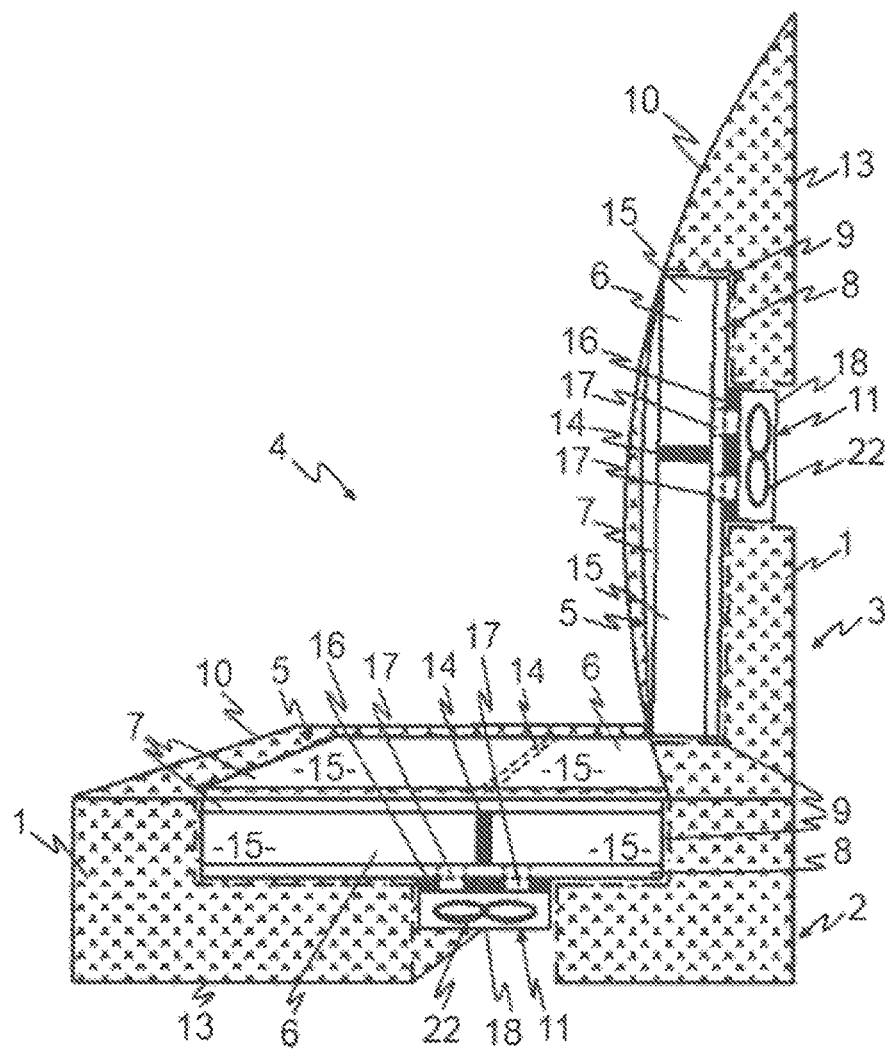
FIG. 5 shows a vehicle seat having an air conditioning device for both the seat cushion part and the backrest part in a schematic sectional view.

The various embodiments, as presented in FIGS. 1 to 4, each show a part of a cushion element 1, which may be a cushion element of a seat cushion part 2 or of a backrest part 3 of a vehicle seat 4, which is shown in a schematic sectional view in FIG. 5.

As FIG. 5 illustrates, the air conditioning device can be integrated both in the seat cushion part 2 and in the backrest part 3, although the air conditioning device is preferably used for air conditioning of the seat cushion part 2. Presented in FIG. 5 is an air conditioning insert 5 as an example, which corresponds to the first embodiment of the air conditioning insert 5 shown in FIG. 1B, in the seat cushion part 2 as well as the backrest part 3 and is described below.

Figure 1B:
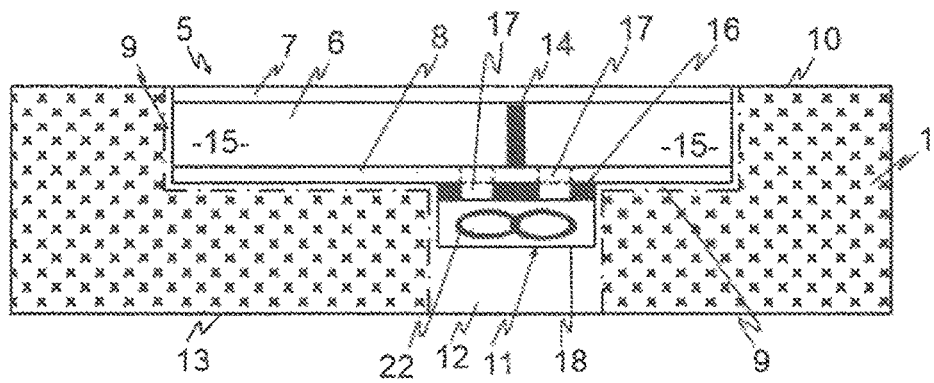
FIG. 1B is a sectional view taken along the section line 1B-1B in FIG. 1A, according to the invention.

The air conditioning device, as presented in the first embodiment according to FIGS. 1A and 1B, has an air conditioning insert 5 with an air distribution space 6, which is covered on the upper side by a top layer 7 and on the bottom side opposite the top layer 7 by a bottom layer 8.

In the first embodiment of FIGS. 1A and 1B, the air conditioning insert 5 is inserted into a recess 9 from the top side 10 of the cushion element 1 such that the air distribution space 6 is delimited laterally by parts of the cushion element 1.

A fan unit 11 is arranged on the bottom side of the air conditioning insert 5 or on the bottom side of the air distribution space 6, respectively, and extends partially into an opening 12 extending from the recess 9 to the bottom side 13 of the cushion element 1.

An essential aspect of the invention is that the air distribution space 6 is subdivided into at least two partial regions 15 by at least one separating element 14, which can also be referred to as a web element, which extends between the top layer 7 and the bottom layer 8.

The fan unit 11 has an air outlet plate 16 with two air outlet openings 17. This air outlet plate 16 can be part of the fan housing 18 or can be placed onto the fan housing 18, as will be described below with reference to FIGS. 9 as well as 10A and 10B.

The fan unit 11 and the separating element 14 are positioned relative to one another in such a way that the air outlet plate 16 assigned to the fan unit 11, which has two air outlet openings 17 in the example of the first embodiment of FIGS. 1A and 1B, rests on the bottom layer 8 of the air distribution space 6 such that air from the fan unit 11 is supplied from one of the two air outlet openings 17 to the two partial regions 15 of the air distribution space 6, separated by the separating element 14.

With this arrangement, air can be supplied directly and in a defined manner to the partial regions 15 of the air distribution space 6 of the air conditioning insert 5 without the need for special flow channels below the air distribution space 6. Such flow channels, which are avoided with the subject of the invention, otherwise have the disadvantage that they can substantially alter the cushioning properties of the cushion structure. Furthermore, there is the risk that the cross section thereof required for the air flow, is adversely affected under load by a person, as a result of which the air flow can be prevented completely.

The air supplied to the partial regions 15 of the air distribution space 6 is then discharged via the top layer 7, consisting of a material which is permeable to air, or through holes (not shown) in the top layer 7.

The cushion element 1 with the air conditioning insert 5, as shown in the figures, is covered by a suitable seat covering, which is not shown in detail.

Figure 2A:
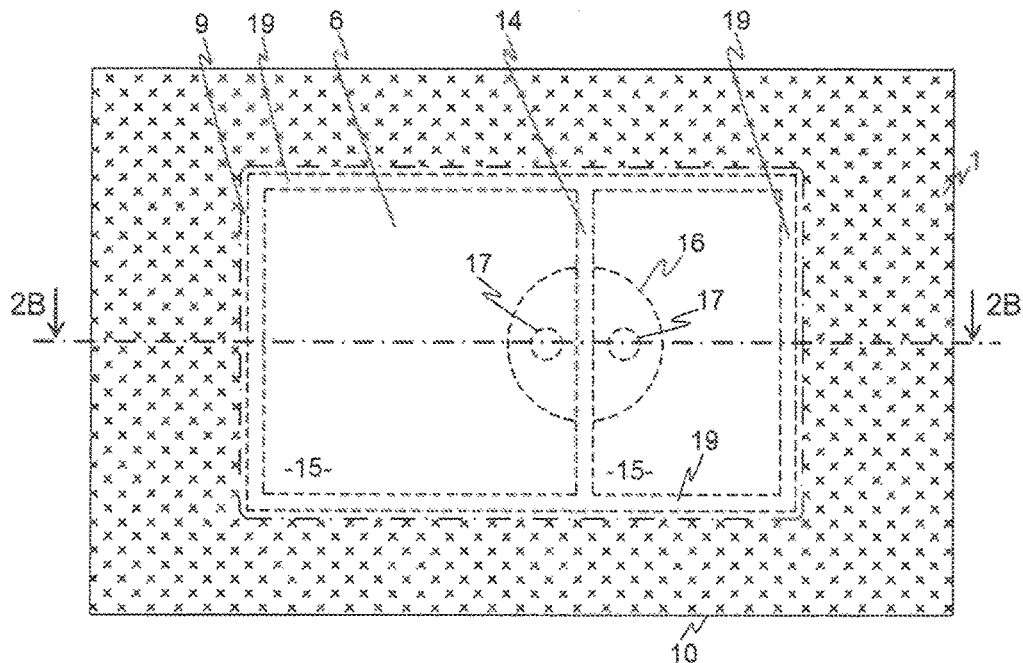
FIGS. 2A and 2B illustrate a second embodiment according to FIGS. 1A and 1B of a cushion element with an air conditioning insert according to the invention.
Figure 2B:
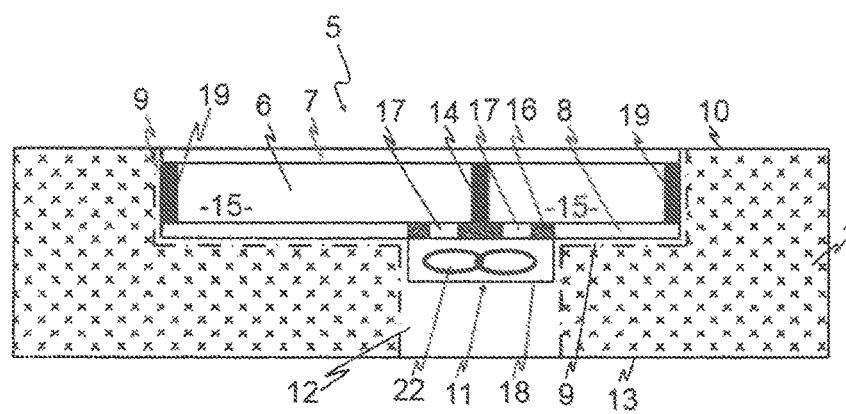

The second embodiment, as shown in FIGS. 2A and 2B, differs from the first embodiment of FIGS. 1A and 1B on the one hand in that the air distribution space 6 is circumferentially delimited by a frame 19 to which both the top layer 7 and the bottom layer 8 are connected, and, on the other hand, in the positioning of the air outlet plate 16 on the bottom layer 8.

As FIG. 2A shows, the separating element 14 extends between the two frame parts located opposite each other of the frame 19. The frame 19 and the separating element 14 can be constructed in one piece from the same material, preferably from a foam material, which is essentially air-impermeable, for example, a punched part. However, it is also provided that the separating element 14 is inserted as a separate component between the frame parts of the frame 19.

Furthermore, in the second embodiment of FIGS. 2A and 2B, the air outlet plate 16 is inserted into the bottom layer 8, while in the first embodiment of FIGS. 1A and 1B the air outlet plate 16 is placed onto the bottom layer 8, wherein the bottom layer 8 has openings, which are associated with the air outlet openings 17 in the air outlet plate 16 and in their size correspond at least to the size of the air outlet openings 17 in the air outlet plate 16.

It shall be pointed out that, in the present description of the various exemplary embodiments, as shown in the figures, not all components are described again for an embodiment if they have already been described or explained with reference to another embodiment. Correspondingly, the description of the various components for one embodiment may be applied to the respective components of another embodiment without explicitly mentioning this. In addition, elements of the various embodiments may be combined with each other, even if this is not described explicitly. This applies in particular to the bottom layer 8, which can be omitted if the material of the cushion element 1 in the area of the recess 9 delimits the air distribution space 6 and prevents substantial air quantities from discharging from the air distribution space 6 via the bottom side. It is also provided that, in cases where a bottom layer 8 delimiting the air distribution space 6 on the bottom side is provided, the air outlet plate 16 is either integrated into the bottom layer 8, as shown in FIG. 2B, or the air outlet plate 16 is placed onto the bottom layer 8, as shown in FIG. 1B.

The third embodiment, as shown in FIGS. 3A and 3B, is comparable to the first embodiment of FIGS. 1A and 1B, but in this third embodiment, the air conditioning insert 5 has only one top layer 7 but no bottom layer. Consequently, the separating element 14 rests only on the air outlet plate 16 on the bottom side of the air distribution space 6.

Especially in those cases in which the air conditioning insert 5 does not have a bottom layer 8 that closes the air distribution space 6 on the bottom side, the fan unit 11 with the fan housing 18 and the air outlet plate 16 should be dimensioned such that the cross section of the opening 12 is completely filled with these components in the cushion element 1, such that the opening 12 is sealed off from the air distribution space 6.

In particular, in one embodiment that corresponds to the third embodiment of FIGS. 3A and 3B, the air distribution space 6 can at least partially be filled with spacer material in heavily stressed areas, which is not shown in detail.

In the fourth embodiment shown in FIG. 4, the air conditioning insert 5 is placed onto the top side 10 of the cushion element 1, wherein the air conditioning insert 5 corresponds to that shown in the first embodiment of FIGS. 1A and 1B, having a frame 19 as in the second embodiment of FIGS. 2A and 2B.

Figure 6A:
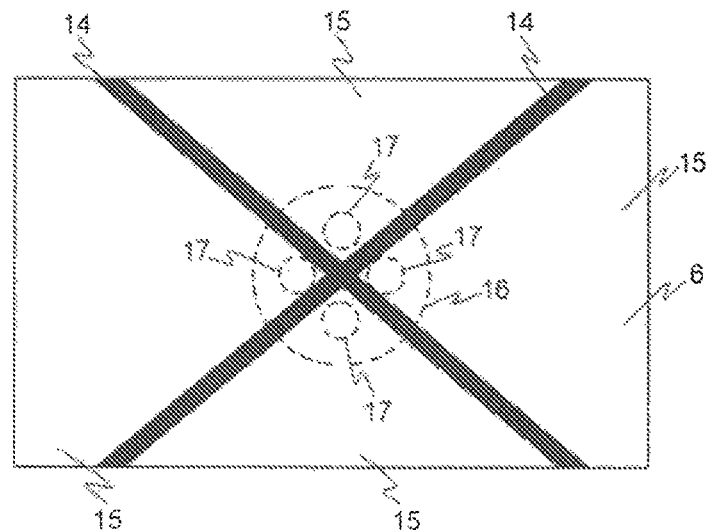
FIGS. 6A to 6H are top views of air conditioning inserts that differ in their different arrangements of the separating elements and the positioning of the air outlet plate with the air outlet openings.
Figure 6B:
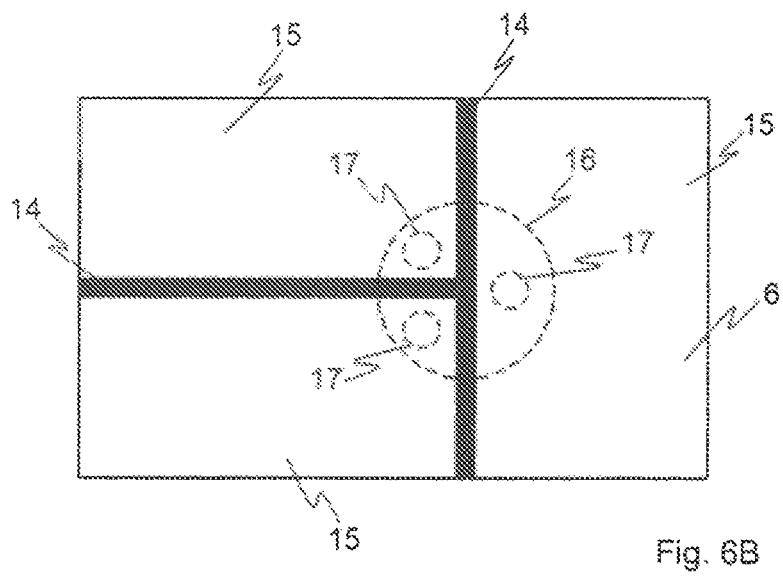
Figure 6C:
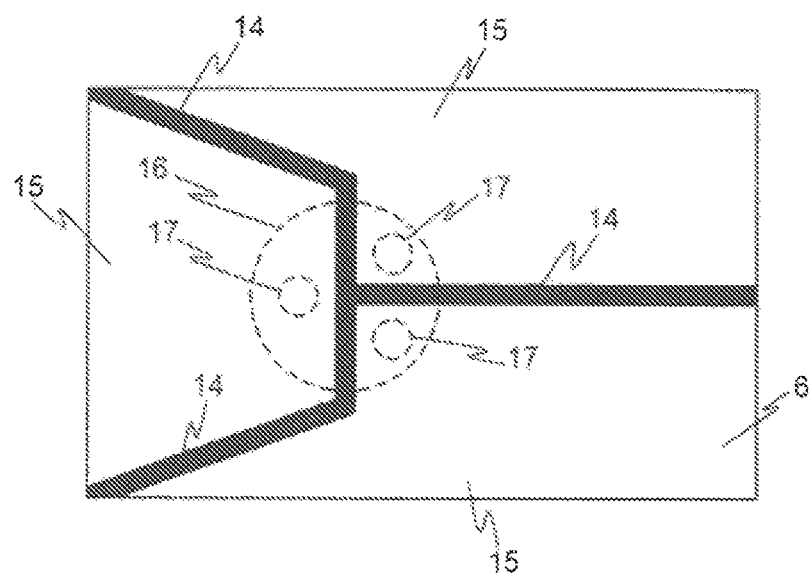
Figure 6D:
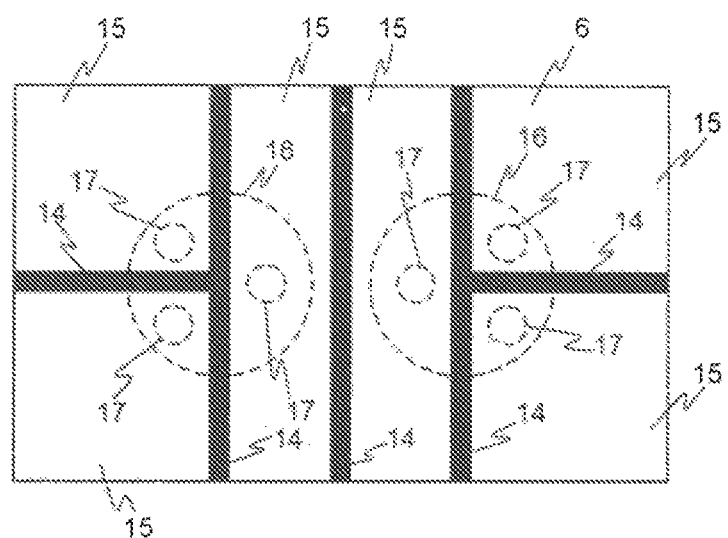
Figure 6E:
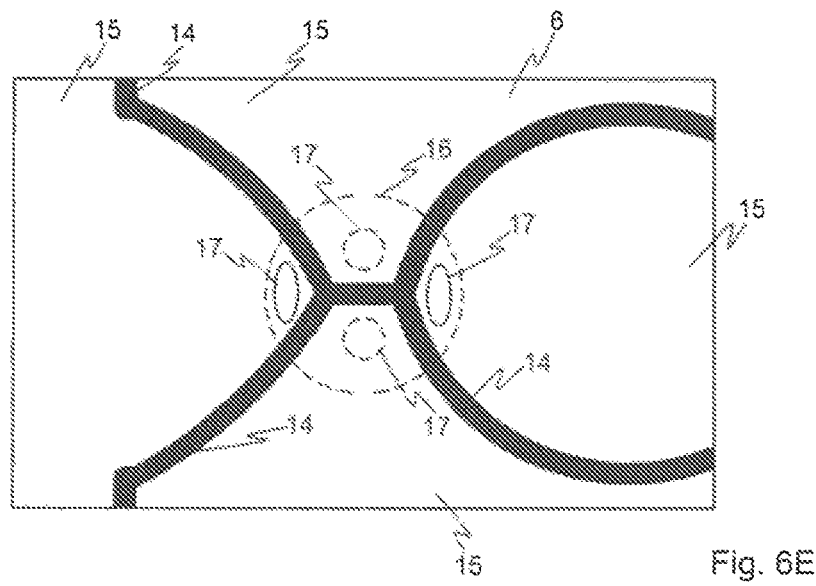
Figure 6F:
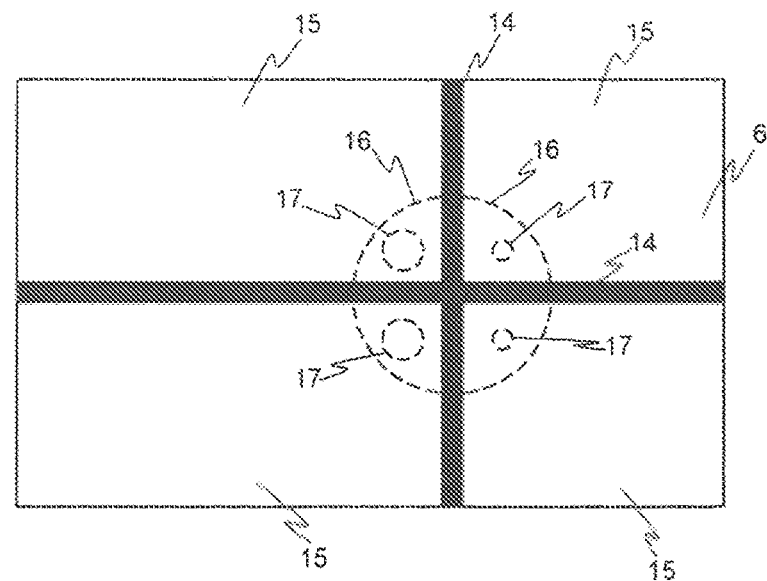
Figure 6G:
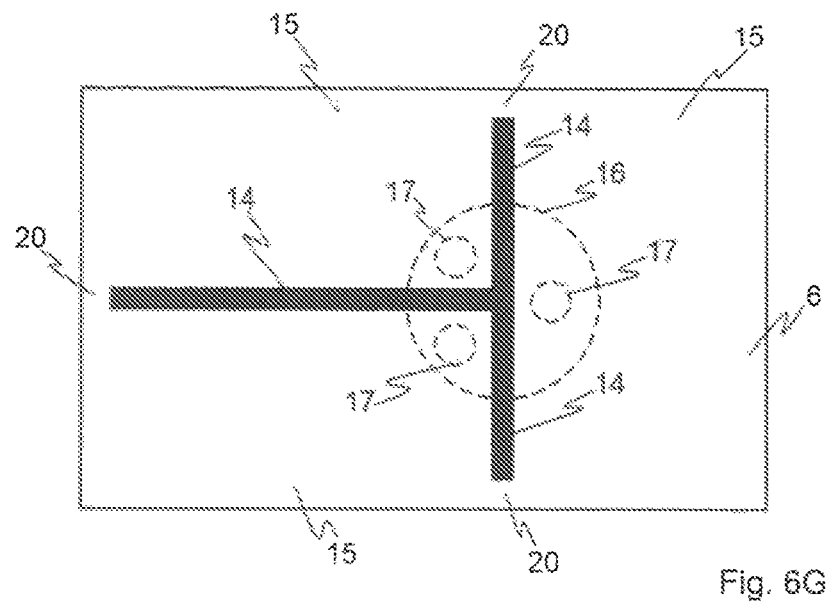
Figure 6H:
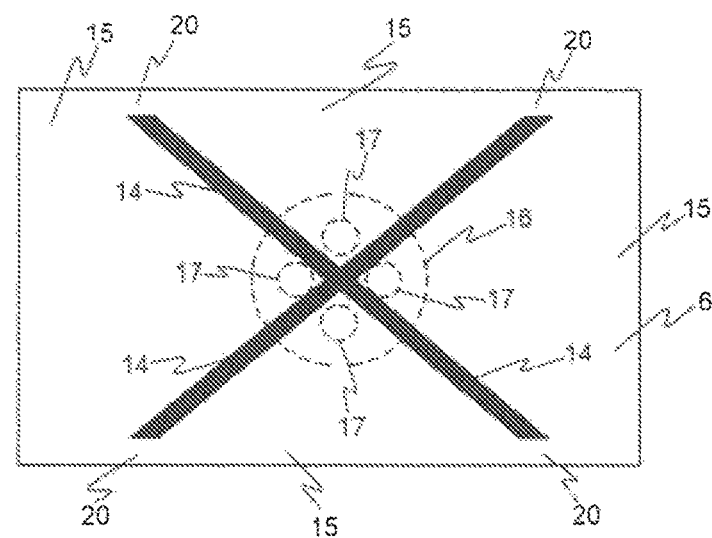
Figure 7A:
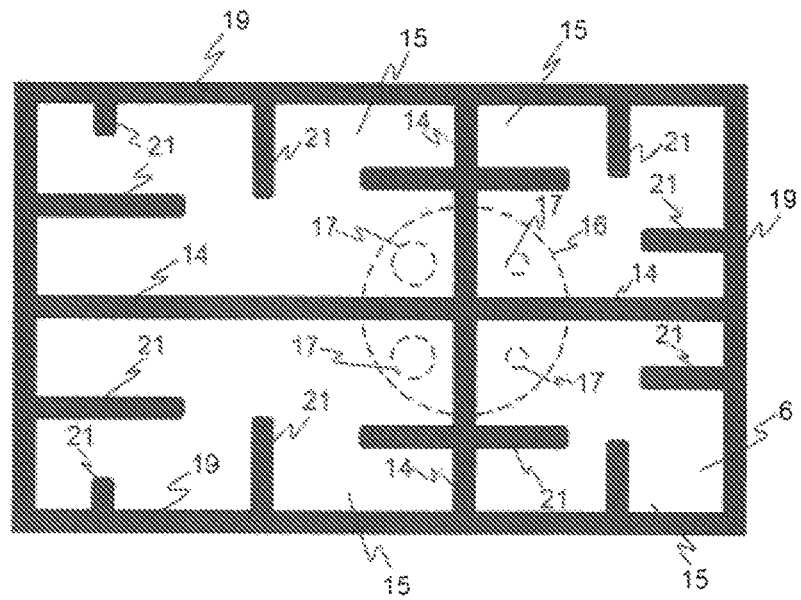
FIGS. 7A to 7C are top views of air conditioning inserts which differ from those of FIGS. 6A to 6H in that they have a circumferential frame and have additional reinforcing bars in the respective partial regions of the air distribution space.
Figure 7B:
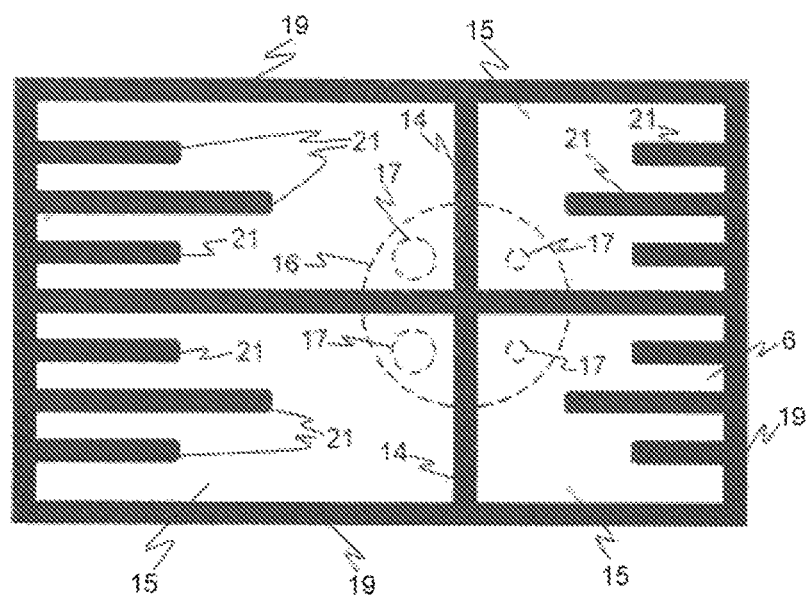
Figure 7C:
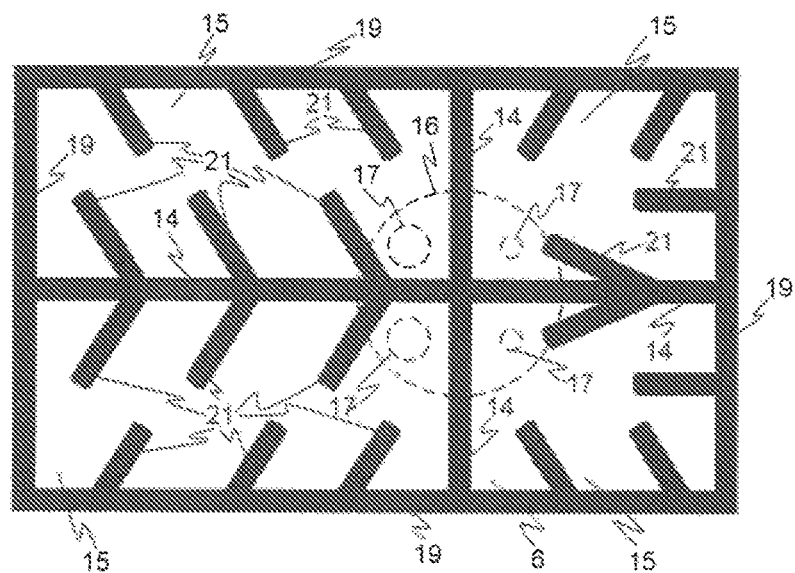

Both FIGS. 6A to 6H as well as FIGS. 7A to 7C each show top views, seen from the direction of the plane of the top layer 7 of the air conditioning insert 5, but without the top layer 7 itself, i.e., the top layer is not shown in these figures for a better overview.

FIGS. 6A to 6H each show top views of the air conditioning insert 5, without the top layer 7, which differ by different arrangements of the separating elements 14 and the positioning of the air outlet plate 16 with the air outlet openings 17.

An essential feature of the invention is that the air distribution space 6 is divided into several partial regions 15 by means of separating elements 14, for example in the form of webs, and the fan unit 11 is provided with an air outlet plate 16 that ventilates directly, i.e., without additional flow channels, each of the partial regions 15. For this purpose, FIG. 6A shows an embodiment in which the air distribution space 6 is divided into four approximately equal-sized partial regions 15 by two separating elements 14, which run crosswise and diagonally to the rectangular outer dimensions of the air distribution space 6. The air outlet plate 16, which has four air outlet openings 17, is arranged in the intersection region of the separating elements 14 such that in each case one of the four air outlet openings 17 is associated with one of the partial regions 15. As a result, each partial region 15 can be supplied with the same air quantity. For this purpose, the air outlet openings 17 have the same opening width, provided that the four partial regions 15 have approximately the same volumes.

In the embodiments of FIGS. 6B and 6C, the air distribution space 6 is subdivided into three partial regions 15. For this purpose, the separating elements 14 of FIG. 6B extend T-shaped relative to one another, and also in such a way that the partial regions 15 have comparable volumes. Correspondingly, an air outlet opening 17 in the air outlet plate 16 is associated with each partial region 15 in order to supply the partial regions 15 with air from the fan unit 11.

FIGS. 6A and 6B show that the separating elements 14 converge at one point or radiate from one point, in the region of which the air outlet plate 16 is arranged, such that each partial region 15 is supplied with air via at least one air outlet opening 17 in the air outlet plate 16.

The example presented in FIG. 6C illustrates that the separating elements 14 need not run in a straight line. However, it must be ensured that the air outlet plate 16 can be positioned such that each partial region 15 is supplied with air via its air outlet openings 17.

It should be apparent that the opening 12 in the cushion element 1 is arranged where the fan unit 11, which at least partially extends into this opening 12, is positioned with the air outlet plate 16 associated therewith.

Although the air outlet plate 16 is shown as a circular plate in the figures, it can also have other shapes to form corresponding air outlet openings 17 therein, which are associated with the partial regions 15 of the air distribution space 6.

FIG. 6D shows an example in which the air distribution space 6 is divided into six partial regions 15 by means of separating elements 14. In addition, the example of FIG. 6D shows a structure in which two fan units 11, each having an air outlet plate 16, are used, wherein the association of the separating elements 14 with the respective air outlet plate 16 corresponds to that also shown in FIG. 6B. In addition, a further separating element 14 is inserted between the two air outlet plates 16, by which the two partial regions 15 are separated.

FIG. 6E shows an example with four partial regions 15. This example is intended to illustrate that the respective separating elements 14 run radially towards each other in the region of the air outlet plate 16, but do not have to have a common connection point. In this example, a small intermediate web, i.e., a small separating element 14 is inserted in the region of the air outlet plate 16. However, it is essential that the air outlet plate 16 extends into each partial region 15 such that an air outlet opening 17 can be associated with each partial region 15. It is also noticeable that the air outlet openings 17 can have different sizes and shapes. Preferably, the opening area of the air outlet openings 17 is adapted to the volume to be ventilated or the size of the respective partial region such that an amount of air corresponding to the volume can be supplied to each partial region 15.

For this purpose, FIG. 6F shows an arrangement with four partial regions 15, of which two partial regions 15 are larger than the other two partial regions 15. Thus, the air outlet plate 16 has larger air outlet openings 17 that are associated with the two larger partial regions 15 than the air outlet openings 17 that are associated with the two smaller partial regions 15 and which are consequently smaller in diameter.

FIG. 6G shows an embodiment that corresponds to the embodiment of FIG. 6B with respect to the arrangement of the separating elements 14 and with respect to the arrangement of the air outlet plate 16 and its air outlet openings 17, whereas the embodiment of FIG. 6H is comparable to that of FIG. 6A. However, in the embodiments of FIGS. 6G and 6H, the free ends of the separating elements 14 terminate at a small distance from the edge of the air distribution space 6, such that pressure equalizing openings 20 are produced there in order to compensate for potential pressure differences in the different partial regions 15. For this purpose, it is sufficient that the separating elements 14 have a distance of a few millimeters from the edge of the air distribution space 6, or from a frame 19 that delimits the air distribution space 6 on the outer side.

In FIGS. 7A to 7C, air conditioning inserts 5 are each shown in top view and differ from those of FIGS. 6A to 6H in that they have a circumferential frame 19. Furthermore, additional reinforcing bars 21, which extend either from the separating elements 14 or from the frame 19 into the respective partial region 15, are present in the respective partial regions 15 of the air distribution space 6. These reinforcing bars 21 can extend perpendicular to the separating elements 14 or the frame 19, as shown in FIGS. 7A and 7B; however, it is also provided that the reinforcing bars 21 are arranged at an angle not equal to 90°, as shown in FIG. 7C. In any case, the length of these reinforcing bars 21 is selected such that they have a free end and are not connected to a separating element 14 with this end. Reinforcing bars 21, which extend from opposite separating elements 14 of a partial region 15, are positioned such that they are offset with respect to one another, as shown in FIG. 7C in the two left partial regions 15.

FIGS. 8A to 8E show schematic partial representations of the arrangement of the separating elements 14 in the region of the air outlet plate 16, which illustrate various possibilities for the allocation of the air outlet openings 17 to the partial regions 15 of the air distribution space 6.

Figure 8A:
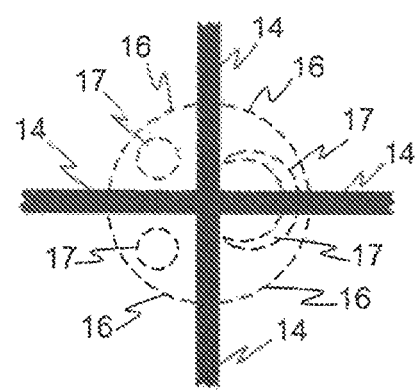
FIGS. 8A to 8E are schematic partial illustrations of the arrangement of the separating elements in the region of the air outlet plate in order to show various possibilities for the allocation of the air outlet openings to the partial regions of the air distribution space.

While in the embodiments described above, a separate air outlet opening 17 in the air outlet plate 16 is associated with each partial regions 15 of the air distribution space 6, FIG. 8A shows the possibility of supplying air to two partial regions 15 of the air distribution space 6 with only one air outlet opening 17 by having the air separated via the separating element 14 from the one air outlet opening 17. The other two partial regions 15 on the left side of the one separating element 14 are each supplied via an autonomous air outlet opening 17.

Figure 8B:
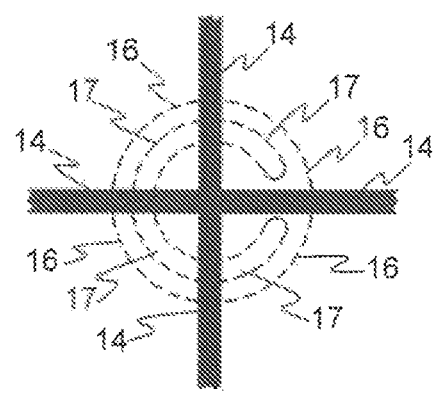

FIG. 8B shows an example in which all four partial regions 15 are supplied with air by an annular or C-shaped air outlet opening 17 in the air outlet plate 16 in that the air outlet opening 17 is subdivided into four partial openings by the separating elements 14.

Figure 8C:
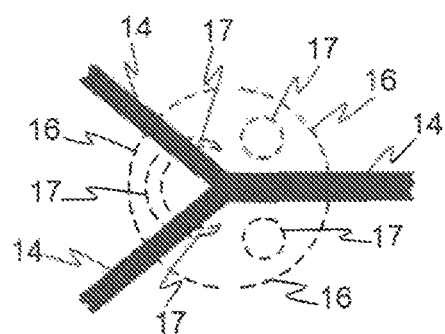

FIG. 8C is to show that a plurality of air outlet openings 17 can be associated with one partial region 15.

Figure 8D:
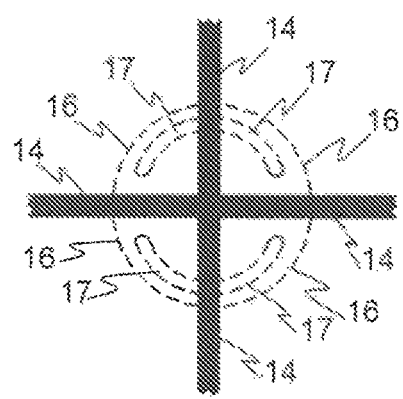

FIG. 8D is comparable to the embodiment of FIG. 8B in that air is supplied to two partial regions 15 through a semicircular opening, divided by the one separating element 14.

Figure 8E:
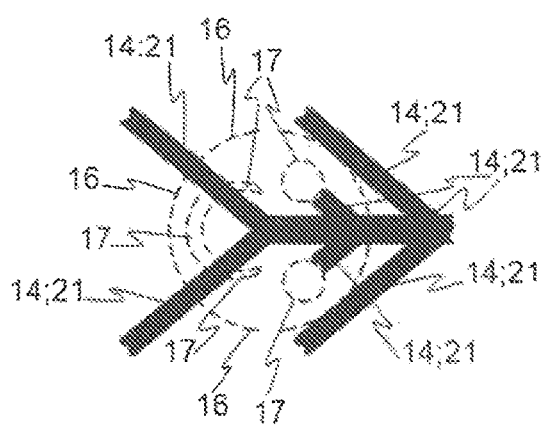

FIG. 8E is comparable to the example of FIG. 8C, wherein short additional reinforcing bars 21 are arranged in the region of the air outlet plate 16; the bars on the right side of the air outlet plate 16 can either be separating elements 14 or reinforcing bars 21.

Figure 9:
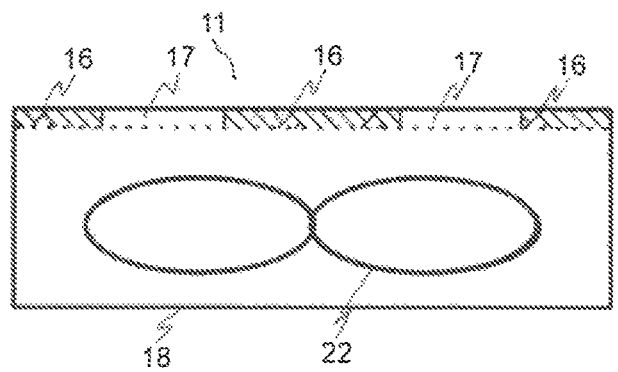
FIG. 9 is a cross section of a fan unit with an air outlet plate as part of the fan housing.

FIG. 9 shows a cross section of a fan unit 11, as can be used in the embodiments described above. The air outlet plate 16 with the air outlet openings 17 in this fan unit 11 is part of the fan housing 18 in which the fan wheel 22 is accommodated. Particularly preferred is a design of the fan housing 18 in which the air outlet plate 16 is held interchangeably, for example via a screw or snap connection, such that the fan unit 11 in modular construction can be adapted to the requirements with respect to the air outlet openings 17 by simple replacement of the air outlet plate 16.

The air outlet plate 16 is held on the side facing the separating element 14 by means of an adhesive, for example by means of a double-sided adhesive tape.

In addition, or in connection with other connection possibilities, the fan housing 18 can be connected at its edge region, at least partially covered using the bottom layer 8.

Figure 10A:
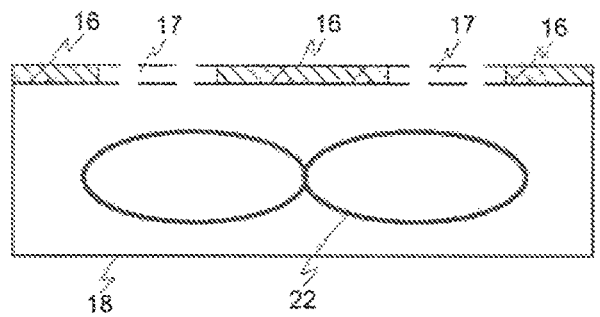
FIGS. 10A and 10B are a cross section corresponding to FIG. 9 of a fan unit in which the air outlet plate is placed onto the fan housing.
Figure 10B:
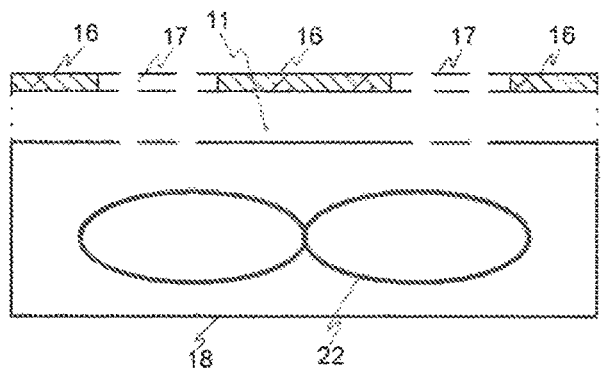

FIGS. 10A and 10B show a cross section corresponding to FIG. 9 of a fan unit 11 in which the air outlet plate 16 is placed onto the fan housing 18 (FIG. 10A) and is thus removed as a single component from the fan housing 18 (FIG. 10B) such that the fan unit 11 with the fan housing 18 is maintained for the various applications and only different air outlet plates 16 are placed onto the fan housing 18.

There has thus been shown and described a novel vehicle seat which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A vehicle seat comprising a seat cushion part, having a cushion element, and a backrest part, at least one of which having an air conditioning device with a fan unit and an air conditioning insert, wherein the air conditioning insert has an air distribution space, which is delimited on one side by at least one top layer, wherein the air distribution space supplies air from the fan unit via at least one bottom layer located opposite the top layer and the air from the air distribution space is dispersed via the top layer, wherein the air distribution space is separated in at least two partial regions by at least one separating element extending between the top layer and the bottom layer, such that one air outlet plate is associated with the fan unit, wherein at least one air outlet opening rests on the plane of the separating element that is associated with the bottom side of the air distribution space such that the at least one air outlet opening supplies air to both the one and the other partial region, and wherein the separating element is formed by an essentially air-impermeable foam material.

2. The vehicle seat as in claim 1, wherein the air distribution space is further divided into a plurality of partial regions by a plurality of additional separating elements, wherein a respective one end of the respective additional separating element is covered by the air outlet plate of the fan unit, said one ends of the additional separating elements being connected to each other in the area of the air outlet plate of the fan unit and thereby separate the respective partial regions with each partial region being associated with at least one air outlet opening or one partial region being associated with an air outlet opening in the air outlet plate.

3. Vehicle seat as in claim 2, wherein said one ends of the additional separating elements extend radially from a common connection point, which is covered by the air outlet plate of the fan unit, and wherein a partial region of the air distribution space is formed between respective adjacent additional separating elements.

4. Vehicle seat as in claim 1, wherein the respective size of the air outlet openings associated with the partial regions is proportionate to the size of the respective partial region.

5. Vehicle seat as in claim 1, wherein an air outlet opening in the air outlet plate, which is associated with a plurality of partial regions of the air distribution space, extends through a plurality of additional separating elements that separate the air distribution space into the several partial regions into the air outlet openings associated with the respective partial regions.

6. Vehicle seat as in claim 1, wherein reinforcing bars are arranged in the respective partial regions and extend between the top layer and the plane associated with the bottom side of the air distribution space.

7. Vehicle seat as in claim 1, wherein the air distribution space is covered at the bottom side located opposite the top layer by a bottom layer.

8. Vehicle seat as in claim 7, wherein the bottom layer is connected to the frame.

9. Vehicle seat as in claim 7, wherein the top layer and the at least one bottom layer are connected to each other around the outer circumference of the air distribution space.

10. Vehicle seat as in claim 1, wherein the air distribution space is delimited by a frame around the outer circumference.

11. Vehicle seat as in claim 10, wherein the top layer is connected to the frame.

12. Vehicle seat as in claim 10, wherein at least one of the reinforcing bars extending from the frame and one or more additional separating elements run in the respective partial region of the air distribution space.

13. Vehicle seat as in claim 10, wherein at least one of the frame and the reinforcing bars are formed of a foam material.

14. Vehicle seat as in claim 1, wherein the fan unit extends at least in part into an opening leading through the cushion element.

15. Vehicle seat as in claim 14, wherein the fan unit draws air via the opening in the cushion element.

16. Vehicle seat as in claim 1, wherein the air outlet plate forms a base area of a fan housing of the fan unit.

17. Vehicle seat as in claim 1, wherein a spacer material is placed in at least one of the partial regions.

18. Vehicle seat as in claim 17, wherein the spacer material fills the partial region.

19. Vehicle seat as in claim 1, wherein partial regions are connected to each other via pressure equalization openings.

20. Vehicle seat as in claim 19, wherein the pressure equalization opening is formed by interruptions of the separating element.

21. Vehicle seat as in claim 19, wherein the pressure equalization opening is formed by the end of the separating element being spaced at a distance from the edge of the air distribution space.

* * * * *